United States Patent
Baudendistel et al.

(10) Patent No.: US 6,422,545 B1
(45) Date of Patent: Jul. 23, 2002

(54) VACUUM ACTUATED ACTIVE DECOUPLER MOUNT

(75) Inventors: Thomas A. Baudendistel, Farmersville; Sanjiv G. Tewani, Lebanon; Mark W. Long, Bellbrook; James E. Dingle, Cincinnati, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/780,857

(22) Filed: Feb. 9, 2001

(51) Int. Cl.[7] ............................................... F16F 13/00
(52) U.S. Cl. .............................. 267/140.13; 267/140.14
(58) Field of Search ....................... 267/140.11–140.15

(56) References Cited

U.S. PATENT DOCUMENTS

| | | | | |
|---|---|---|---|---|
| 4,991,826 A | * | 2/1991 | Hoying et al. | 267/140.11 |
| 5,183,243 A | * | 2/1993 | Matsumoto | 267/140.13 |
| 5,240,233 A | * | 8/1993 | Kato et al. | 267/140.13 |
| 5,246,212 A | * | 9/1993 | Funahashi et al. | 267/140.13 |
| 5,386,977 A | * | 2/1995 | Quast | 267/140.13 |
| 5,769,402 A | * | 6/1998 | Ide et al. | 267/140.14 |
| 5,992,833 A | * | 11/1999 | Tanahashi | 267/140.13 |
| 6,055,317 A | * | 4/2000 | Muramatsu et al. | 267/140.13 |
| 6,176,477 B1 | * | 1/2001 | Takeo et al. | 267/140.11 |

* cited by examiner

Primary Examiner—Christopher P. Schwartz
(74) Attorney, Agent, or Firm—Scott A. McBain

(57) ABSTRACT

A hydraulic engine mount includes opposed mounting members secured to an elastomeric body and a base, respectively, and an orifice plate assembly interposed the body and the base to define a pumping chamber and a reservoir or opposed pumping chambers for fluid to flow therebetween through an orifice track formed by the orifice plate assembly. One or two elastomeric decoupler discs may be secured in recesses between two orifice plates of the orifice plate assembly and form spaces which are operable to be in communication with a vacuum source to impose vacuum pressure on the decouplers at selected frequencies as controlled by solenoid operated valves and a controller. The mount may be operated at a substantially reduced dynamic stiffness lower than the static stiffness of the mount to provide improved low amplitude vibration isolation, in particular.

9 Claims, 3 Drawing Sheets

VACUUM ACTUATED ACTIVE DECOUPLER MOUNT

FIELD OF THE INVENTION

The present invention pertains to a hydraulic mount, particularly adapted for motor vehicle applications, including a vacuum actuated decoupler operable to modify the dynamic stiffness of the mount.

BACKGROUND

Conventional automotive vehicle powertrain mounts exist in many variations and generally operate to provide engine vibration isolation while also controlling engine motion with respect to the vehicle frame or body structure. In many applications of engine and powertrain mounts, it is desirable to vary the dynamic stiffness of the mount to provide selective isolation of vibrations at certain frequencies related to engine speed, for example.

By way of example, for a four cylinder engine, the mount is desirably made to provide lower dynamic stiffness at the frequency of vibration related to the second order of engine speed (revolutions per minute). Accordingly, if the dynamic stiffness of the mount assembly can be varied and can be made lower than the static stiffness of the mount, improved vibration isolation can be obtained to reduce noise and vibration transmitted from the engine into the vehicle structure. It is to these ends that the present invention has been developed.

SUMMARY OF THE INVENTION

The present invention provides a mount, particularly adapted for automotive vehicle powertrain mount applications, which utilizes one or more decouplers which can be controlled to provide a lower dynamic stiffness of the mount assembly at predetermined frequencies to thereby provide improved vibration isolation between the structure supported by the mount and the structure supporting the mount.

In accordance with an important aspect of the present invention, a hydraulic engine mount is provided which is characterized by an elastomer body defining a fluid pumping chamber, a partition interposed the elastomer body and a fluid reservoir and an orifice track communicating hydraulic fluid between the pumping chamber and the reservoir. The reservoir is preferably delimited by a flexible diaphragm and the mount includes an elastomer type decoupler to aid in isolating relatively high frequency, low displacement vibrations. However, the decoupler may be modified in its performance characteristics by applying a vacuum to one side of the decoupler to modify the performance of the mount, particularly by substantially reducing the dynamic stiffness of the mount at predetermined vibration frequencies.

In accordance with another aspect of the present invention, a hydraulic type mount is provided which includes one or more active decouplers which may be controlled by solenoid operated valves, respectively, and a source of vacuum to modify the dynamic stiffness of the mount to isolate vibrations at particular frequencies. The decoupler or decouplers may be actuated at the same frequency as the vibrations being input to the mount and the phase angle of actuation of the decoupler may be selectively varied. The dynamic stiffness of the mount may be modified to be lower than the static stiffness to improve the vibration isolation characteristics of the mount, particularly for low amplitude relatively high frequency vibrations.

In accordance with still another aspect of the present invention, a hydraulic mount is provided which includes opposed pumping chambers and opposed vacuum actuated active decouplers which may be selectively actuated to provide for a wider range of stiffness of the mount at selected frequencies. For example, if the mount was supporting an engine that generates large second order shaking forces, the decouplers could vibrate in phase with these forces which would make the mount softer and operable to isolate such forces.

Those skilled in the art will further appreciate the above mentioned advantages and features of the invention together with other important aspects thereof upon reading the detailed description which follows in conjunction with the drawing.

DETAILED DESCRIPTION OF A PREFERRED EMBODIMENT

Figure 1:
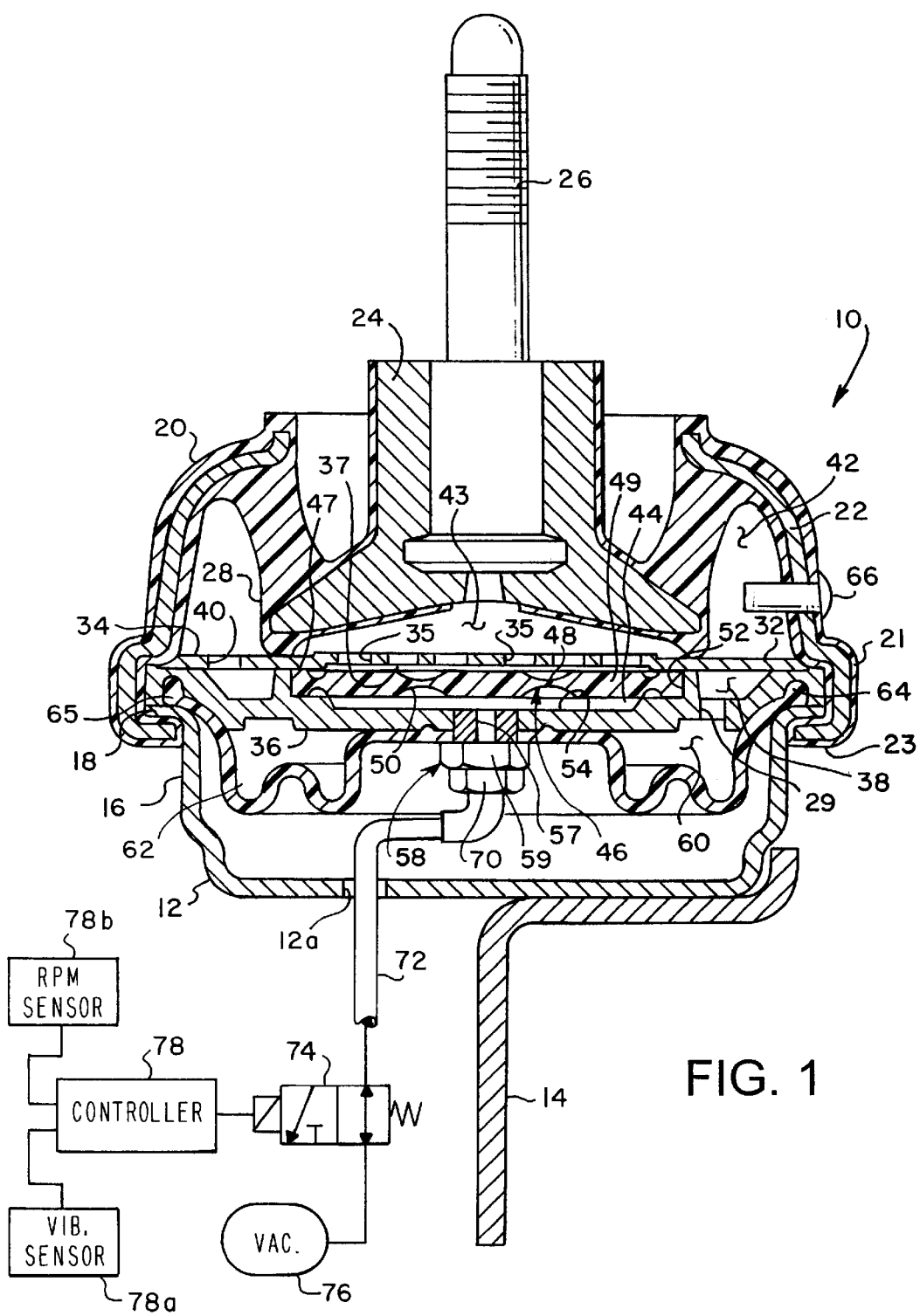
FIG. 1 is a longitudinal central section view of a vacuum actuated active decoupler mount in accordance with the present invention.

In the description which follows, like parts are marked throughout the specification and drawing with the same reference numerals, respectively. The drawings are not necessarily to scale and certain features may be shown in somewhat generalized or schematic form in the interest of clarity and conciseness.

Referring to FIG. 1, there is illustrated a hydraulic mount in accordance with the invention and generally designated by the numeral 10. The mount 10 includes a generally cylindrical cup shaped formed metal base number 12 suitably secured to a mounting member or bracket assembly 14 in a conventional manner. The base number 12 includes a peripheral sidewall 16 and a circumferential radially outwardly projecting flange 18. The mount 10 is further characterized by a generally cylindrical molded elastomer body 20 which is reinforced by an encapsulated, flexible, thin walled metal core part 22. The body 20 is molded to a central metal hub member 24 which supports a threaded mounting member 26 for connecting the mount 10 to an engine assembly or the like. The elastomer body 20 includes a central, generally cylindrical depending portion 28 which, in the position shown, is engageable with an orifice track assembly 32. Orifice track assembly 32 includes an upper, generally planar, cylindrical orifice plate 34 and a lower, generally planar, cylindrical orifice plate 36. Orifice plates 34 and 36 are shown in assembly to define an annular passage or orifice track 38 which opens through a port 40 to a fluid pumping chamber 42 formed between the body 20 and the orifice plate assembly 32. A circumferentially spaced port 29 communicates hydraulic fluid between orifice track 38 and a second fluid chamber or reservoir 60.

Lower orifice plate 36 also defines a generally cylindrical central recess 44 in which is disposed an elastomeric cylindrical disc shaped decoupler member 46 which is preferably dimensioned to include opposed, shallow, annular recess or channel portions 48 and 50. Recess 44 is defined by a peripheral outer wall 52 and a reduced diameter generally planar bottom wall surface 54 which is relieved to provide a space between wall surface 54 and a major part of a disc shaped body portion 49 of decoupler 46, as shown. The decoupler 46 is also characterized by a circumferential rim part 47 which is trapped in fluid tight sealing engagement between the upper orifice plate 34 and the lower orifice plate 36. However, a major part of the body 49 of the decoupler 48, radially inward of the rim 47, is allowed limited space within the recess 44 between the wall surface 54 and the upper orifice plate 34.

Upper orifice plate 34 is also provided with a relieved cylindrical wall surface 37 to provide space between decoupler 46 and orifice plate 34 except at the rim 47. The space defined between the wall surface 54 and the decoupler 46, for example, may be vented through a port 57 formed in an otherwise fluid tight plug 58 shown disposed in a suitable opening formed in the lower orifice plate 36. Plug 58 also includes a flange or head 59 engaged with a central hub portion of a generally cup shaped flexible elastomer diaphragm 62. Diaphragm 62 delimits the reservoir 60, as shown in FIG. 1.

The hydraulic mount 10 is shown in a position wherein the cylindrical body portion 28 of the elastomer body 20 rests on the orifice plate 34. However, under mount operating conditions, hydraulic fluid is also present in a pumping chamber portion 43 which is in direct communication with the chamber 42. Moreover, as mentioned above, the decoupler member 46 is dimensioned such that there is some free space for movement between the decoupler and the orifice plates 34 and 36. Suitable passages 35 are formed in the orifice plate 34 to allow communication of fluid between the pumping chamber 42, 43 and the space between the decoupler 46 and the orifice plate 34.

The hydraulic mount 10 also includes the aforementioned fluid reservoir 60 defined by and between the flexible diaphragm 62 and the orifice plate 36. The diaphragm 62 includes a circumferential rim portion 64 which is shown nested in a suitable annular groove 65 formed in the lower orifice plate 36.

As further shown in FIG. 1, the mount 10 may be assembled by securing the rim 64 of the diaphragm 62 between the flange 18 of the base member 12 and the periphery of the orifice plate 36. The orifice plates 34 and 36 are also held in fluid tight assembly with each other at their peripheral edges by a circumferential rim portion 21 of the body 20 which is suitably displaced to form a radially inwardly directed peripheral flange 23 contiguous with the base member flange 18. A suitable rivet type plug 66 projects through the wall of the body 20 and closes a fill port for filling the pumping chamber 42, 43 and the reservoir chamber 60 with a suitable hydraulic fluid, such as a mixture of water and ethylene glycol.

Referring still further to FIG. 1, the mount 10 includes a suitable connector 70 for a conduit 72 which extends through an opening 12a in the base plate and extends to a control valve 74. Control valve 74 is operable to be in communication with a source of vacuum 76 which, for example, may be a conventional vacuum reservoir onboard an automotive vehicle used for other vacuum operated components of the vehicle. The control valve 74 may, as shown, comprise a two position solenoid actuated valve and is preferably connected to a suitable controller 78 which may include a vibration sensor 78a and/or an engine speed sensor 78b operably connected thereto. Controller 78 is also operably connected to a source of electrical power, not shown, and the controller is operable to control the valve 74 to impose a vacuum on the space within recess 44 disposed between the decoupler 46 and the wall surface 54 to deflect the decoupler as a consequence of changes in fluid pressure acting on the decoupler. In the position a of valve 74 the space between decoupler 46 and wall surface 54 may be "vented" to atmospheric pressure or merely blocked wherein the vented condition would not see any change in pressure acting on the decoupler.

For example, the valve 74 may be energized to move cyclically between positions a and b to cause the decoupler 46 to be actuated at the same frequency as a particular input vibration imposed on the mount 10 and at a predetermined phase angle to the input vibration displacement such that a substantial reduction in the resistance to motion of the mount is obtained. In this way, a large reduction in the dynamic stiffness of the mount 10 may be obtained. Accordingly, the mount 10 may be operated in such a way as to be "softer" at certain vibration frequencies to which the mount is exposed. By actuating or deflecting the decoupler 46 by the imposition of vacuum pressure thereon, the dynamic stiffness of the mount 10 can be reduced substantially at selected vibration frequencies and thereby provide excellent isolation between an engine and a body or frame structure of an automotive vehicle, for example. The controller 78 and valve 74 may be operated to provide selective isolation characteristics for the mount 10 at certain frequencies related to engine crankshaft speed (rpm). For example, the mount 10 can be made to provide lower dynamic stiffness at a frequency related to the second order of the rotational speed (rpm) of the engine crankshaft of an inline four cylinder engine.

Figure 2:
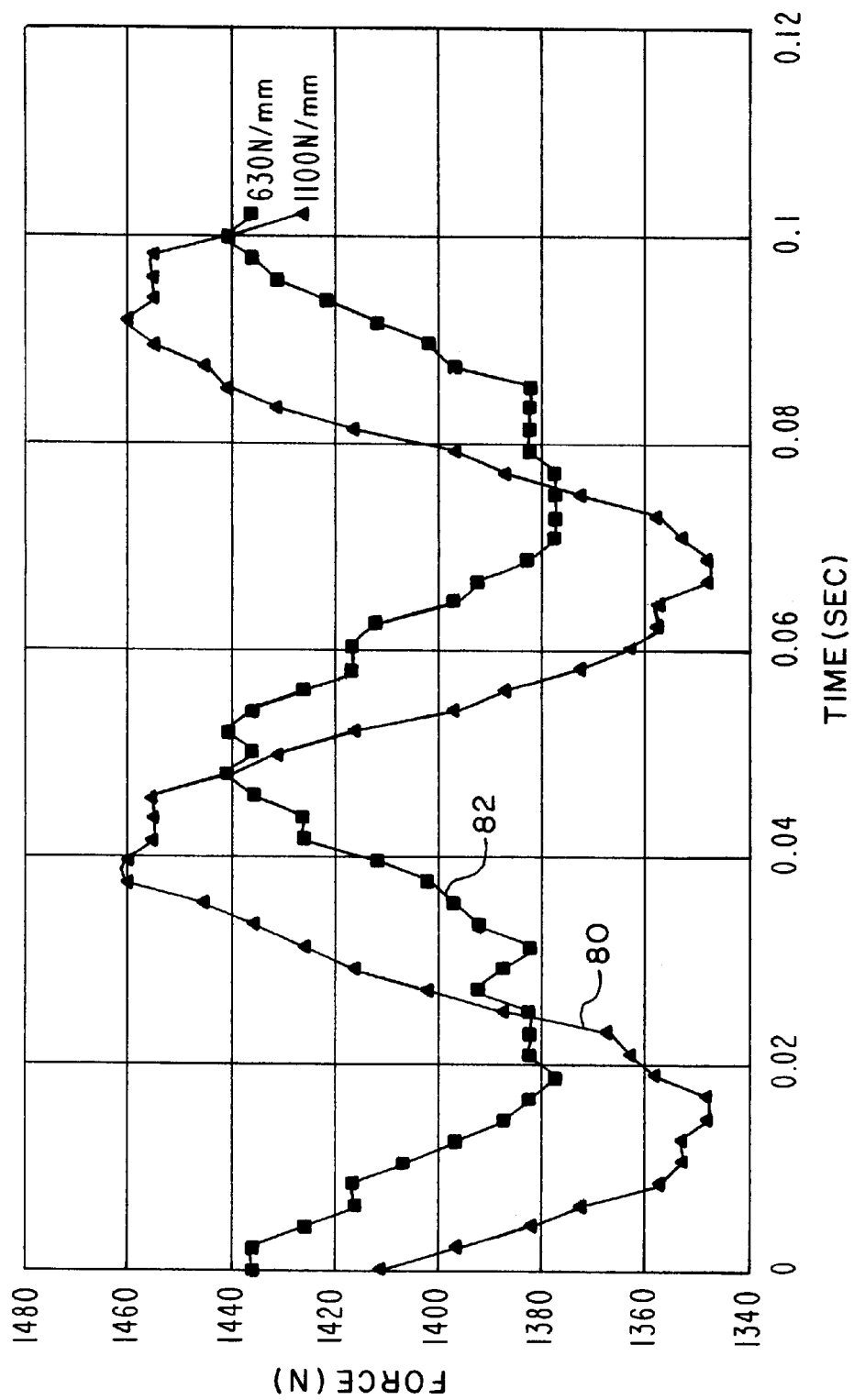
FIG. 2 is a diagram illustrating a force versus frequency characteristic for the mount shown in FIG. 1.

Referring to FIG. 2, there is illustrated a diagram of force in Newtons (N) versus time in seconds (sec). The curves of FIG. 2 illustrate operating conditions wherein the mount 10 is vibrated at an input displacement thereto at a frequency of thirty Hertz (Hz) and the force required to move the mount at a particular displacement was recorded. The curve 80 indicates the forces required to move the mount 10 at a vibration frequency of thirty Hertz and a vibration displacement of 0.1 millimeters (mm) peak-to-peak when the space between the decoupler 46 and the wall surface 54 is continuously vented to atmosphere, for example. The curve 82 indicates the forces required to move the mount 10 at the same vibration displacement and frequency when the aforementioned space is connected to the source of vacuum 76 and vented to atmosphere, alternately, at a frequency of thirty Hertz and an appropriate phase angle with respect to the oscillatory vibration input to the mount. The aforementioned phase angle will be dependent on response time of valve 74, and materials and geometry of the components of the mount 10. It may be observed from FIG. 2 that the forces required to effect displacement of the mount 10 for the vibration displacement and frequency mentioned above are less for the vacuum actuated decoupler 46 as compared with the situation where the decoupler is continuously vented directly to atmospheric pressure, for example.

Those skilled in the art will appreciate from the foregoing description and drawing figures that the mount 10, being of a decoupled typed, may be operated to respond to input vibrations in a manner which is softened versus a nondecoupled mount or a non-externally actuated decoupler mount of the same general configuration. Of course, the orifice track 38 is subject to design variations with regard to predetermined track cross sectional areas and length, depending on the so-called design tuning frequency of the mount.

Still further, the configuration of the mount 10 exhibits damping forces much lower than a nondecoupled mount since some of the fluid within the mount deflects the decoupler 46. The pumping stiffness of the chamber 42, 43 may be modified by the decoupler 46 and the vacuum chamber defined between the decoupler and the wall surface 54, resulting in a softer feel in a vehicle wherein the vehicle engine is supported by mounts such as the mount 10. The orifice plates 34 and 36 are dimensioned such that sufficient motion of the decoupler 46 is allowed without the decoupler impinging strongly on the orifice plates. When the input amplitude is sufficient to move the decoupler 46 forcibly against the wall surface 54, the pumping stiffness of the mount 10 increases further and all the additional pumping pushes fluid through the orifice track 38.

Figure 3:
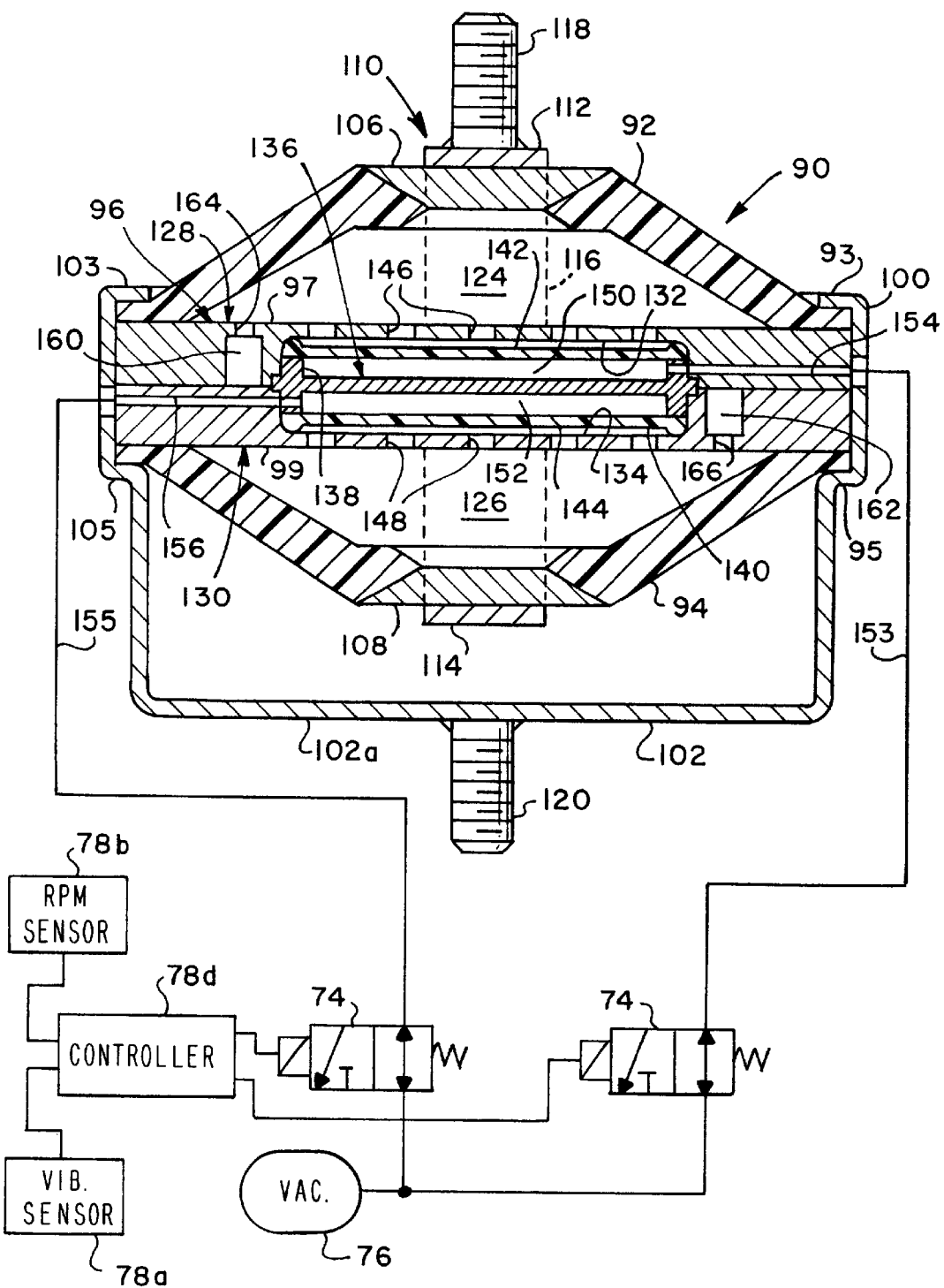
FIG. 3 is a longitudinal central section view of an alternate embodiment of a vacuum actuated active decoupler mount in accordance with the invention.

Referring now to FIG. 3, there is illustrated, in somewhat schematic form, an alternate embodiment of a vacuum actuated hydraulic mount in accordance with the invention and generally designated by the numeral 90. The hydraulic mount 90 is characterized by opposed, somewhat frusto-conical shaped elastomeric body members 92 and 94 between which is disposed a generally cylindrical partition 96. The body members 92 and 94 include generally circular peripheral rim portions 93 and 95, respectively, which are engaged with opposed faces 97 and 99 of partition 96 and are forcibly secured thereto fluid tight sealed relationship by a generally cylindrical circumferential collar part 100 of a generally cylindrical can-shaped support base member 102. The cylindrical collar 100 is formed with a reentrant circumferential edge 103 spaced from and opposed to a circumferential flange portion 105 for clamping the rim portions 93 and 95 of the body members to the partition 96. Body members 92 and 94 are, respectively, suitably secured to mounting element hub members 106 and 108 which are, in turn, secured to a generally rectangular ring shaped mounting bracket 110. Mounting bracket 110 is preferably formed as a generally rectangular perimeter or ring shaped member to allow clearance for the body members 92 and 94 between opposed side parts 112 and 114 which are interconnected by further opposed side parts 116, one shown, to provide a generally rectangular perimeter configuration of the mounting bracket. Side parts 112 and 114 are suitably fixed to hub members 106 and 108, respectively. A threaded shank part 118 is suitably secured to the side part 112 of mounting bracket 110. In like manner, a threaded shank type mounting element 120 is coaxial with and extends in a direction opposite to the direction of the mounting element 118 and is secured to a bottom wall 102a of base member 102.

47. Opposed fluid filled pumping chambers 124 and 126 are formed between the body member 92 and the partition 96 and between the body member 94 and the partition 96, respectively, as illustrated. Partition 96 is characterized by opposed, separable, generally circular disc orifice plate members 128 and 130 which include, respectively, generally circular centrally positioned recesses 132 and 134 formed therein. Recesses 132 and 134 are isolated from each other by a third plate member of partition 96 and generally designated by numeral 136. Plate member 136 is formed with two opposed annular rims 138 and 140 which are engageable, respectively, with the peripheral edges of circular disc elastomer decoupler members 142 and 144, respectively. The decoupler members 142 and 144 are retained in the recesses 132 and 134 by the plate member 136 when the plate members 128 and 130 are assembled to form the partition 96 and retained forcibly engaged with each other by the clamping arrangement provided by the collar 100. Decoupler members 142 and 144 are in communication with fluid in the chambers 124 and 126 through respective ports 146 and 148 formed in the plate members 128 and 130 and opening into the recesses 132 and 134, respectively.

The decoupler members 142 and 144 also, respectively, form opposed chambers 150 and 152 between the respective decoupler members and the partition plate 136. Chamber 150 is in fluid flow communication with a vacuum conduit 153 by way of a passage 154 formed in plate 128. In like manner, chamber 152 is in fluid flow communication with a conduit 155 by way of a passage 156 formed in partition plate 130. The partition plates 128 and 130 are also formed with an orifice track formed by partial annular channel portions 160 and 162 which overlap with each other sufficiently to provide communication of hydraulic fluid between chambers 124 and 126 through the channel portions 160 and 162 and via a port 164 which opens from channel portion 160 to chamber 124 and a port 166 which opens from channel portion 162 to chamber 126.

The mount 90 is adapted to be controlled by a controller 78d similar to the controller 78 but adapted for controlling two solenoid operated valves 74, each operable to be in fluid flow communication with vacuum source 76 and with the conduits 153 and 155, as shown in FIG. 3. Controller 78d is also operable to receive signals from a vibration sensor 78a and/or a engine speed (RPM) sensor 78b.

Accordingly, the mount 90 may be operated in a manner similar to the mount 10 but has the added advantage of being capable of changing its stiffness over a wider range of frequencies and vibration amplitudes by employing opposed vacuum actuated active decouplers 142 and 144 to increase the range of stiffness of the mount. The mount 90 may be operated in generally the same manner as the mount 10.

The construction and operation of the mounts 10 and 90 is believed to be understandable to those of ordinary skill in the art based on the foregoing description and the drawing figures. Conventional engineering materials may be used to construct the mounts 10 and 90.

Although a preferred embodiment has been described in detail therein, those skilled in the art will recognize that various substitutions and modifications may be made to the invention without departing from the scope and spirit of the appended claims.

What is claimed is:

1. A hydraulic mount, comprising
   a first and a second pumping chamber;
   said first and second pumping chambers formed by mounting a first and a second elastomeric body member in an opposed manner with a partition interposed therebetween, said pumping chambers in fluid connection with one another;
   means to operably attach said mount between a base and an operating component so that vibrational force inputs from one of said operating component or said base are transferred to one of the first pumping chamber or the second pumping chamber;
   means to control said hydraulic mount so that dynamic stiffness of the mount is modified.
2. The mount of claim 1, wherein the partition comprises a pair of opposed elastomer disc decouplers which are operably attached to and supported by an orifice plate assembly and in fluid communication with said pumping chambers.
3. The mount of claim 2, wherein the orifice plate assembly comprises a first, a second, and a third plate member;
   said third plate member being concentric to and smaller in diameter than the first and second plate members;

said third plate member including opposed recesses formed by opposed annular rims;

said opposed elastomer disc decouplers being forcibly engaged against the peripheral edges of the annular rims of the third plate member by clamping the first and the second plate member.

4. The mount of claim 3, wherein opposed chambers are formed by the decoupler and the recesses in the third plate member of the orifice plate assembly.

5. The mount of claim 4, wherein passages in the orifice plate assembly provide fluid flow communication from the opposed chambers and decouplers to vacuum conduits.

6. The mount of claim 6, wherein conduits are connected to said passages for communicating pressure fluid between a vacuum source and said chambers.

7. The mount of claim 6, wherein control valves connected to said conduits are operable to alternately place said decouplers in communication with vacuum pressure and a pressure greater than said vacuum pressure to modify the dynamic stiffness of said mount.

8. The mount of claim 1, wherein the first and second elastomeric body members each comprise a frustoconical shape with a mounting hub and a rim portion.

9. The mount of claim 8, wherein the means to operably attach the hydraulic mount device between said operating component and said base comprises first and second mounting members;

said first mounting member including a support base member with a collar capable of attaching to and clamping the opposed pumping chambers at the junction of the rim portions of the opposing body members and the partition;

said second mounting member including at least one mounting bracket;

said mounting bracket including a first and a second end;

said first end being operably attached to the hub of the first elastomeric body member;

said second end being operably attached to the hub of the second elastomeric body member.

* * * * *